United States Patent
Barfuss et al.

(10) Patent No.: US 11,667,068 B2
(45) Date of Patent: Jun. 6, 2023

(54) DEVICE AND METHOD FOR CONTINUOUSLY BLOW MOLDING FIBER-REINFORCED THERMOPLASTIC HOLLOW PROFILES HAVING A CONSTANT OR CHANGING CROSS-SECTION

(71) Applicant: HERONE GMBH, Dresden (DE)

(72) Inventors: Daniel Barfuss, Dresden (DE); Alexander Rohkamm, Dresden (DE); Philipp Schwanemann, Dresden (DE); Veit Würfel, Dresden (DE)

(73) Assignee: HERONE GMBH, Dresden (DE)

( * ) Notice: Subject to any disclaimer, the term of this patent is extended or adjusted under 35 U.S.C. 154(b) by 73 days.

(21) Appl. No.: 17/053,315

(22) PCT Filed: Apr. 25, 2019

(86) PCT No.: PCT/EP2019/060556
§ 371 (c)(1),
(2) Date: Apr. 7, 2021

(87) PCT Pub. No.: WO2019/214951
PCT Pub. Date: Nov. 14, 2019

(65) Prior Publication Data
US 2021/0237330 A1 Aug. 5, 2021

(30) Foreign Application Priority Data
Mar. 11, 2018 (DE) .................... 10 2018 111 283.1

(51) Int. Cl.
*B29C 49/20* (2006.01)
*B29C 49/00* (2006.01)
(Continued)

(52) U.S. Cl.
CPC .......... *B29C 49/20* (2013.01); *B29C 49/0005* (2013.01); *B29C 49/04* (2013.01);
(Continued)

(58) Field of Classification Search
CPC ... B29C 49/20; B29C 49/6409; B29C 49/185; B29C 49/0005; B29C 49/04;
(Continued)

(56) References Cited

U.S. PATENT DOCUMENTS

2012/0295046 A1    11/2012    Levesque

FOREIGN PATENT DOCUMENTS

DE    19803965 A1    2/1998
DE    69810487 T2    4/1998
(Continued)

OTHER PUBLICATIONS

Excerpt of German Office Action for Application No. DE10 2018 111 283.1, dated Jun. 22, 2020. (1 page).
(Continued)

*Primary Examiner* — Monica A Huson
(74) *Attorney, Agent, or Firm* — Workman Nydegger (57) ABSTRACT

The invention relates to a device and a method for semi-continuous blow moulding of fiber-reinforced, thermoplastic, endless, hollow-profile-shaped components with longitudinally constant or varying cross-sections, consisting of at least one consolidation tool, which, in its closed state, encloses a preform enclosing an elastically moldable pressure chamber.

15 Claims, 6 Drawing Sheets

(51) Int. Cl.
  B29C 49/04 (2006.01)
  B29C 49/64 (2006.01)
  B29K 101/12 (2006.01)
  B29K 307/04 (2006.01)
  B29K 309/08 (2006.01)

(52) U.S. Cl.
  CPC ...... B29C 49/6409 (2013.01); *B29K 2101/12* (2013.01); *B29K 2307/04* (2013.01); *B29K 2309/08* (2013.01)

(58) Field of Classification Search
  CPC .............. B29C 49/44; B29C 48/9185; B29C 2791/001; B29C 48/2694; B29C 49/6481; B29C 2791/007; B29C 48/0017; B29C 48/901; B29C 48/09; B29C 48/0011; B29C 48/001; B29D 99/0007; B29D 23/001; B29K 2101/12; B29K 2105/08; B29K 2105/0872; B29K 2309/08; B29K 2311/10; B29K 2307/04
  See application file for complete search history.

(56) References Cited

FOREIGN PATENT DOCUMENTS

| | | |
|---|---|---|
| DE | 102009057498 A1 | 12/2009 |
| DE | 102011056391 A1 | 12/2011 |
| DE | 102012201262 A1 | 1/2012 |
| DE | 102012112021 A1 | 12/2012 |
| DE | 102013111746 B4 | 10/2013 |
| DE | 102014019152 A1 | 12/2014 |
| DE | 102015009250 A1 | 7/2015 |
| DE | 102015011844 A1 | 9/2015 |
| DE | 102018111283.1 A1 | 5/2018 |
| EP | 1175295 B1 | 5/2000 |
| EP | 1368179 B1 | 3/2001 |
| WO | 1998016376 A1 | 4/1998 |
| WO | 2019214951 A1 | 11/2019 |

OTHER PUBLICATIONS

International Written Opinion for PCT/EP2019/060556, dated Nov. 14, 2019. (13 pages: 6pp. original and 7pp. English translation).
International Search Report for PCT/EP2019/060556, dated Sep. 2, 2019. (6 pages: 4pp. original and 2pp. English translation).

DEVICE AND METHOD FOR CONTINUOUSLY BLOW MOLDING FIBER-REINFORCED THERMOPLASTIC HOLLOW PROFILES HAVING A CONSTANT OR CHANGING CROSS-SECTION

CROSS-REFERENCE TO RELATED APPLICATIONS

The present patent application is a 371 US Nationalization of International Patent Application No. PCT/EP2019/060556, filed Apr. 25, 2019, which claims priority to German Patent Application No. 102018111283.1, filed May 11, 2018. The entire disclosures of the aforementioned patent applications are incorporated herein by reference.

BACKGROUND OF THE INVENTION

1. Field of the Invention

The invention relates to a device and a process for producing endless fiber-reinforced, thermoplastic, hollow profile-shaped components with a constant or varying cross-section by blow moulding, based on a fiber-thermoplastic composite material.

2. The Relevant Technology

During blow molding, a strand-shaped, hollow preform is placed on a pressure-proof membrane and consolidated semi-continuously into its final shape by applying an internal pressure as well as temperature, and is molded in an external tool. In case of this patent application, "preform" refers to an intermediate production step of components made from fiber reinforced composites, in which an unconsolidated preform, which already has a final number of reinforcement filaments and layers, is shaped such it corresponds almost to the final component dimensions. At the same time, the preform contains the necessary amount of matrix material, which is integrated into the preform via yarns. In case of this application, "filaments" refer to textile fibers of endless length. "Consolidation" refers to the processing step in which the matrix material is flowable and soaks the reinforcement filament content such that after solidification no capillary actions can occur within the component. In case of this application, quasi continuously shall mean that a plurality of components are created by a plurality of successive process steps.

The document DE 698 104 87 T2 discloses a blowing process and a device for the production of hollow parts made of fiber reinforced composites with thermoplastic matrix material. The matrix is thread-shaped and mixed with the reinforcing material in the unconsolidated state. The pressure membrane used in the process is elastic and almost resembles the inner shape of the hollow part. The preform applied to the pressure membrane is formed by inserting it into a two-shell, closable and heatable tool that is heated to the melting temperature of the thermoplastic matrix material. After the holding time, the tool must cool down to room temperature in order to demould the component. Alternatively, the preform may be heated up. The cooling process takes place in the tool with variothermal temperature control.

A disadvantage is posed by the necessity of a heating and cooling circuit in the closed state of the mould, resulting in long cycle times.

DE 198 039 65 A1 describes a process for the production of hollow moulded parts, based on fiber reinforced composites. The preform is made by a variety of textile-technologically processed hybrid yarns consisting of a mixture of reinforcement filament and matrix filament applied to a pressure bladder. Before inserting the pressure bladder and the preform into a tool with at least two shells, the preform is heated by contact or contactless heating above the melting temperature of the thermoplastic matrix. By pressurizing the bladder, the preform and its molten matrix material are pressed against the wall of the tool. The cooling process immediately starts by heat conduction between the actively cooled wall of the tool and the preform.

A significant disadvantage is that the necessary flow of the liquefied matrix takes place, but not under temperature and simultaneous pressurization, since the molten matrix solidifies immediately upon contacting the actively cooled mold wall. As a result, the reinforcement filament content is not constantly wetted with matrix material across the entire thickness of the component.

DE 1020 090 574 98 A1 describes a process for the production of strand-shaped hollow profiles from fiber reinforced composites. A hose made from textile-technologically processed reinforcement and plastic filaments is pushed onto a plastic hose. Both are then pressed against a heated tool wall by inflating the plastic hose. In a further embodiment, a third hose made of a plastic of the same kind may be pushed outside around the reinforcement filament content. The three-layer structure is then consolidated in the same way as the two-layer structure. The inner plastic hose is inflated by compressed air and thus cooled at the same time, so that only the side of the hose that is in contact with the reinforcement filament content is melted. The pressure required for the process is preferably 10-50 bar.

The disadvantage here is that the strand-shaped component, which is formed as a hollow body, can only be produced discontinuously. At the same time, the shaping of the strand-shaped profile is limited, as the basic hose-shaped structure of the inflatable hose must be maintained in order to ensure the necessary tightness for the pressure medium.

DE 1020 110 563 91 A1 describes a method for manufacturing a pipe made of fiber reinforced composites suitable for transporting liquids at high pressures. For this purpose, an extruded plastic hose is coated with a tube consisting of reinforcing filaments and consolidated in a similar way to DE 1020 090 574 98 A1. Alternatively, the reinforcing filament layer may be joined to the plastic hose with a suitable adhesive.

This document describes a process for manufacturing a hose for the transport of liquid media and therefore represents a different technological field.

Another process for the production of hollow bodies made of fiber reinforced composites is known from DE 1020 121 120 21 A1. The preform consisting of endless reinforcement and matrix filaments is pressed against a variothermal tool wall by using an expansion profile. The plastic matrix material melts and wets the reinforcement filaments. After reducing the pressure and cooling the component inside the mould, it can be removed.

A particular disadvantage is that the heating and cooling takes place within the moulds closed state, so that the cycle time of the process depends on the heating and cooling rate of the metallic tool.

Another solution is described in EP 011 752 95 B1. The preform, which is applied to an inflatable plastic bag, is inserted into a mould with at least two shells, and is pressed against the variothermal tool walls with compressed air at a pressure of more than 40 bar. Pressure and temperature are constant during the flow time of the thermoplastic or thermoset matrix. After solidifying or curing the matrix by cooling the tool walls, the component can be removed.

With this solution, the cycle rate also depends on the heating and cooling time of the tool, thus dictating the cycle time of the process.

EP 013 681 79 B1 describes a process for the production of hollow bodies based on fiber reinforced composites with thermoplastic matrix material. Using a braiding process, the reinforcement filament material, which is mixed with a thermoplastic material, is applied to an extruded plastic body. After completing the preform construction, it is fed to a consolidation device consisting of a two-shell mould. By applying pressure on the extruded plastic body, which presses the preform to the heated tool wall, the thermoplastic matrix material is melted and thus the reinforcement filament material is wetted. The thermoplast solidifies by cooling the mould.

The disadvantage is that the production process is discontinuous, since the component length corresponds to the respective tool length.

Another known manufacturing process is described in DE 10 20 150 092 50 A1. The so-called orbital winding makes it possible to place ribbon shaped endless reinforcement filaments—so-called tapes—on a rotationally symmetrical or non-rotationally symmetrical core of any length. In particular, tapes shall be used in which the reinforcing fibers are embedded in a thermoplastic matrix material. By local, non-contact heating beyond the melting temperature of the thermoplastic and by pressing the tape onto the winding base with the help of a press roll, the consolidation of the material takes place.

This method has the disadvantage of high investment costs. As soon as a typical multilayer composite has to be produced, several orbital winding heads, each requiring a cost-intensive heating device, must be placed one behind the other. Furthermore, the consolidation process is considered disadvantageous as the cooling process is based solely on the thermal conductivity of the material below the deposited tape and therefore varies depending on the layer structure. Due to the heat conduction below the deposited tapes, a controlled cooling process of the thermoplastic is not possible. It cannot be ruled out that the material cools down too quickly, and the cooling process therefore negatively influences the crystallization in the thermoplastic matrix component. Furthermore, an irregular surface of the component cannot be prevented due to the system, as the outer contour of the strand-shaped component is not pressed against a tool wall for forming. Optically high-quality component surfaces cannot be realized in this way.

BRIEF SUMMARY OF THE INVENTION

The object of the invention is to provide a method and a device for the quasi-continuous production of strand-shaped, hollow components with constant or varying profile cross-sections made of fiber reinforced composites.

According to the invention, this object is solved by a device according to claim 1, and a method according to claim 8. Preferred embodiments are given in the dependent claims.

The invention is directed to a device for carrying out the method according to the invention. The at least two-piece and closable forming tool encloses the preform segment in its closed state, which in turn encloses the pressure chamber arranged inside. The horizontally positioned center axes of the forming tool, the preform segment and the pressure chamber are arranged concentrically.

According to the invention, the forming tool consists of at least three tool segments that can be heated isothermally and independently of each other, and are thermally decoupled from each other by heat transfer barriers. In addition, the mold segments have quickly exchangeable modules on their inner side, whose geometry of the inner wall corresponds to the outer contour of the preform segment. In a first embodiment according to the invention, the inner walls of the modules have a constant cross-section over the entire length of the forming tool.

Another component of the device is a pressure chamber, which is enclosed by the preform. In an alternative embodiment of the invention, this pressure chamber is formed from an endlessly supplied hose-shaped pressure membrane, the outer side thereof coated with the preform, and the sealing elements. The sealing elements are in turn positioned apart from each other on a coupling element. The coupling element is fixed in the area of the preforming unit and its central axis is arranged concentrically to the pressure chamber. The sealing elements acting in radial direction are locked to the pressure membrane when pressurized. The force required for sealing is transferred to the pressure membrane by the radially acting seals, transferred to the preform segment and dissipated into the tool segments.

The internal pressure p1 required for expanding the radially acting seals is introduced through radially arranged air outlets in the region of the pressure elements, which in turn are connected to a pressure line running inside the coupling element.

The wall thickness of the pressure membrane is between 50 μm and 200 μm, preferably between 50 μm and 100 μm, and particularly preferred between 50 μm and 60 μm.

The pressure p2 necessary for the compaction of the preform is between 5 bar and 9 bar. The pressure p1 needed to generate the sealing effect is higher than the pressure p2.

In an alternative and equally preferred embodiment, the pressure chamber consists of a fixed hose corresponding to the length of the consolidation device made of a temperature-stable, stretchable material, and the two sealing elements, which are positioned at a (defined) distance from each other, and which are locked to the preform via tensioning.

In an alternative, particularly preferred embodiment, the tool segment of the consolidation zone is designed such that components with axially and radially varying cross-sections are formed.

The method according to the invention uses a consolidation unit that makes it possible to consolidate a preform consisting of mineral endless reinforcement filaments and a thermoplastic matrix into a component with a modular, multi-part forming tool and an internal pressure chamber in a semi-continuous process. Here, thermoplastic materials with a melting temperature of up to 380° C. are used.

In a first step, a preform segment with a continuous diameter and cross-section is produced. Within the meaning of this application, the term "preform segment" describes a strand-shaped element that, in relation to the longitudinal axis of the forming tool, consists of a section of the non-consolidated preform with preheated and melted matrix material, the pressure membrane remaining in the component, and a section made of consolidated material. Here, the preform is formed onto a hose-shaped pressure membrane in multiple layers, which in turn wraps a molding core, using a suitable textile yarn application process.

Such yarn application processes are known as braiding or spiralizing processes that place a specified number of hybrid yarns or tapes with a reinforcement filament content at a given angle on a form-giving core. The tapes or hybrid yarns are applied in such a way that the core surface is covered completely.

In a second method step, this preform is inserted into the forming tool together with the tubular pressure membrane using a known pull-off device such that the sealing elements are located inside the pressure membrane. For this method step, the sealing elements are put into a pressureless state and the split forming tool is opened such that the preform has no contact to the inner side.

Below, the preform positioned in this way is referred to as the preform segment.

In a third method step, the forming tool is transferred to its closed state and the pressure chamber is pressurized. As a result, the radial distance between the pressure membrane and the inner wall of the forming tool is reduced, resulting in a compaction of the material. At the same time, the material is tempered in accordance with the temperature zones by the outside of the preform segment contacting the inner walls of the tool segments.

The process-relevant temperature regimes of the individual tool segments of the forming tool are described below.

In the area of the first isothermally heated tool segment, the preform segment in Section 14.1 is heated up to a temperature below the melting temperature of the thermoplastic used (cf. FIG. 8).

In the area of the second isothermally heated tool segment, the preform segment in section 14.2 is simultaneously heated to a temperature above the melting temperature of the thermoplastic used. As a result, the molten thermoplastic material begins to flow and wets the reinforcement filaments (cf. FIG. 8).

Figure 8:
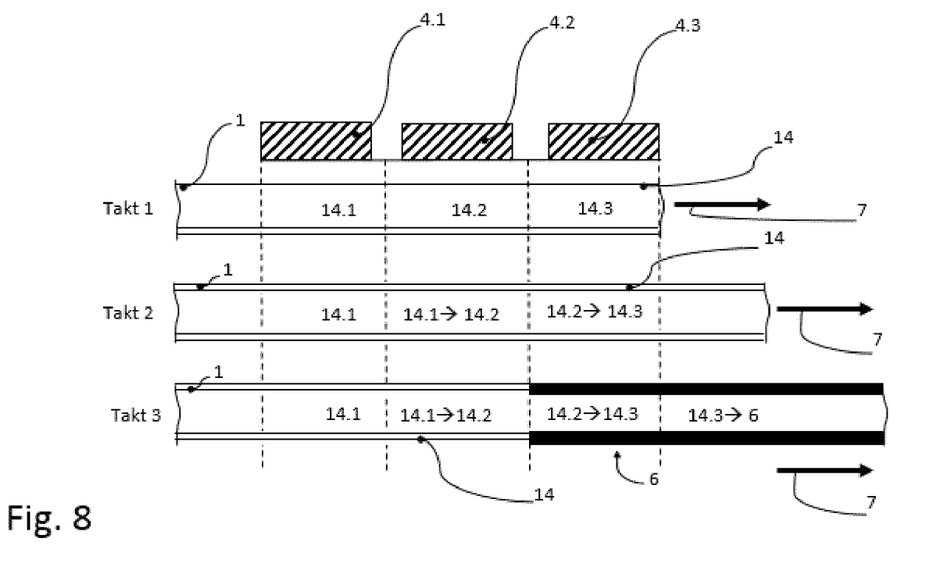
FIG. 8 shows a schematic representation of the cycles of the method.

At the same time, in the area of the third isothermally heated tool segment, the final consolidation of the preform segment in its section 14.3 to the material takes place as a result of the cooling of the molten thermoplastic material and the compression of the preform by the consolidation pressure p2 between the pressure membrane and the tool walls, which contours correspond to the outer contour of the component (cf. FIG. 8).

In a fourth method step, the forming tool is opened and the pressure chamber is brought into a pressure-free state. Thus, the preforming segment detaches from the inner wall of the forming tool and can be conveyed with the help of a known pull-off device by a partial length s of the forming tool. Here, the preform segment is shifted such that the previous section 14.1 of the preform segment is the new section 14.2 and the previous section 14.2 of the preform segment is the new section 14.3. The previous section 14.3 represents the final component (cf. FIG. 8).

These four method steps are repeated until the final component length is reached, or the resulting strand, consisting of a large number of components, has reached its desired length.

As a result of the process, when the process is cycled for the first time, a waste results which consists of the first two preform segments B and C, since these two segments do not go through the complete temperature regime of the process.

The quasi-continuous working process according to the invention represents a significant advantage over the state of the art. Especially the isothermal temperature control of the individual tool sections leads to a reduction of the cycle time and thus to a more energy-efficient process compared to the methods and devices that are known from the state of the art, since the respective tool sections are not subject to temperature changes, and therefore no time-determining heating and cooling phases of the tools have to be considered. The material is also cooled in a controlled manner. In contrast to the methods and devices known from the state of the art, the adjustable temperature gradient between the individual temperature zones can be used to influence the cooling rate and thus the complete crystallization in the thermoplastic.

BRIEF DESCRIPTION OF THE DRAWINGS

The invention is explained in more detail below with reference to drawings and an exemplary embodiment, without being restricted thereto. For the sake of clarity, only the tool (4) is displayed hatched in the sectional views.

FIG. 7b shows a side view of a preforming unit based on the braiding process.

FIG. 7c shows a top view of a preforming unit based on the spiralization process

DETAILED DESCRIPTION OF THE PREFERRED EMBODIMENTS

Figure 1:
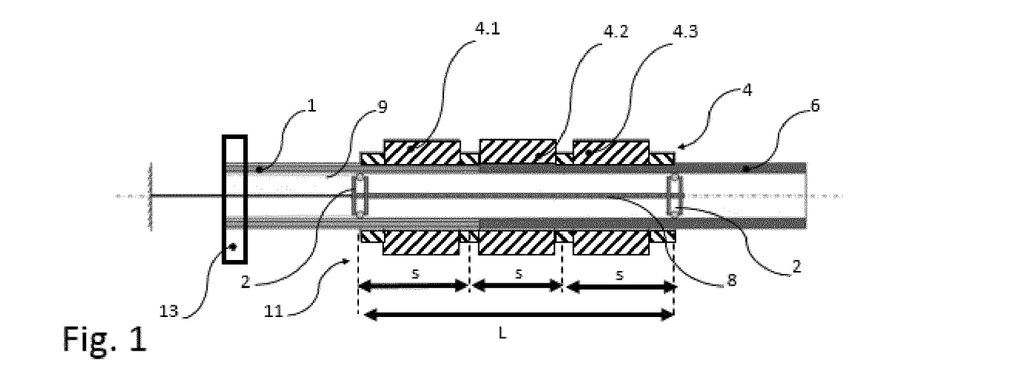
FIG. 1 shows a side view of the consolidation tool according to the invention.

FIG. 1 shows a side view of a consolidation device (11), in which a tube-shaped preform (1), which is applied to a tube-shaped pressure membrane (9) with the help of a textile-technological preforming unit (13), is consolidated into a component (6) in several process steps. In a first embodiment according to the invention component 6 has a constant cross-section. For the purposes of this application, the length L corresponds to the distance between the sealing elements (2) and the partial length s is the length of a tool segment (4.1, 4.2, 4.3).

Figure 1A:
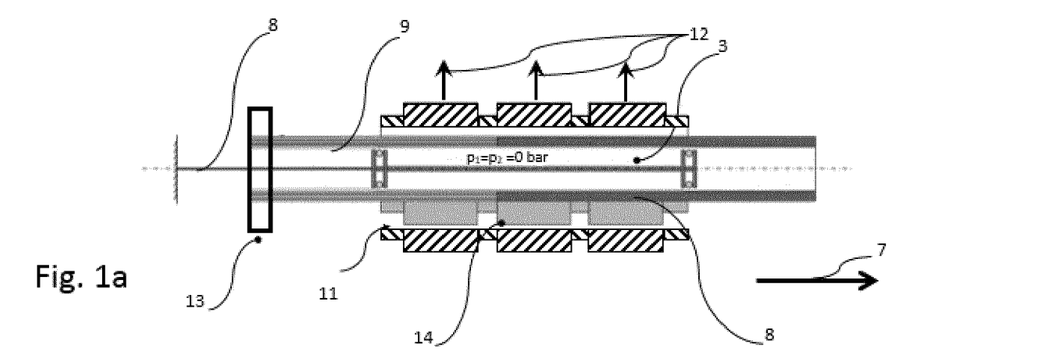
FIG. 1a shows a side view of the consolidation tool according to the invention in a first method step, in a pressureless and open state to convey the preform segment.

FIG. 1a shows a side view of the consolidation device according to the invention in a first step of the method in which the preform segment (14) is moved into the consolidation device in the feed direction (7). According to the invention, the hose-shaped pressure membrane (9) is pulled over the sealing elements (2) in the feed direction (7). The feed travel of the preform segment corresponds to the partial length s.

To enable the feed motion, the pressure chamber (3), comprising the pressure membrane (10) and the sealing elements (2), is opened in an unpressurized state (p1=p2=0) and the separable forming tool (4) is separated in the radial direction of the preform segment by the opening path (12). The amount of the opening path (12) must be selected in a way that the preform segment (14) can be moved in an axial direction without contact to the tool (4).

Figure 1B:
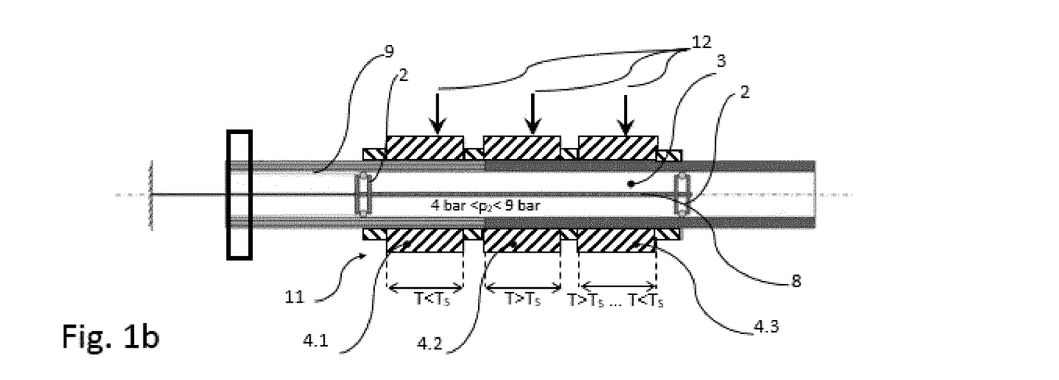
FIG. 1b shows a side view of the consolidation tool according to the invention in a second method step in a closed and pressurized state, together with temperature zones.

FIG. 1b shows a side view of the consolidation device according to the invention in a further method step with a closed tool (4) and a pressurized pressure chamber (3).

The pressure chamber (3) according to the invention is made of the sealing elements (2), which are subjected to a pressure p1, and the pressure membrane (9), which is subjected to a pressure p2. The length of the pressure chamber corresponds to the distance L in between the sealing elements (2), which are connected in a pressure-tight manner to a coupling element (8). This coupling element (8) according to the invention has a longitudinal bore extending over its entire length and radial bores in the area of the sealing elements (2), which make it possible to generate a pressure p in the sealing elements (2). The mode of action of the sealing elements (2) is described in detail in connection with FIGS. 5 and 6. In the area of the preforming unit (13), the coupling element (8) is arranged concentrically to the central axis of the consolidation device (11).

The consolidation pressure p2 is kept constant between 4 bar and 9 bar for the consolidation time of the material. The sealing pressure p1 is higher than the consolidation pressure p2.

The tool segment of the heating zone (4.1) is heated to a temperature below the melting temperature of the embedded matrix material used (T<TS).

The tool segment of the melting zone (4.2) has a temperature above the melting temperature of the embedded matrix material used (T>TS).

The tool segment of the consolidation and solidification zone (4.3) has a temperature below the melting temperature of the embedded matrix material used (T<TS), which is selected so that the embedding material solidifies in such a way that the resulting component can be handled.

For the purposes of this application, isothermal refers to the fact that the tools have constant temperatures in the respective temperature zones (4.1, 4.2 and 4.3) regardless of the method step.

The duration of the pressure application corresponds to the matrix-specific flow time in the melting state.

Figure 1C:
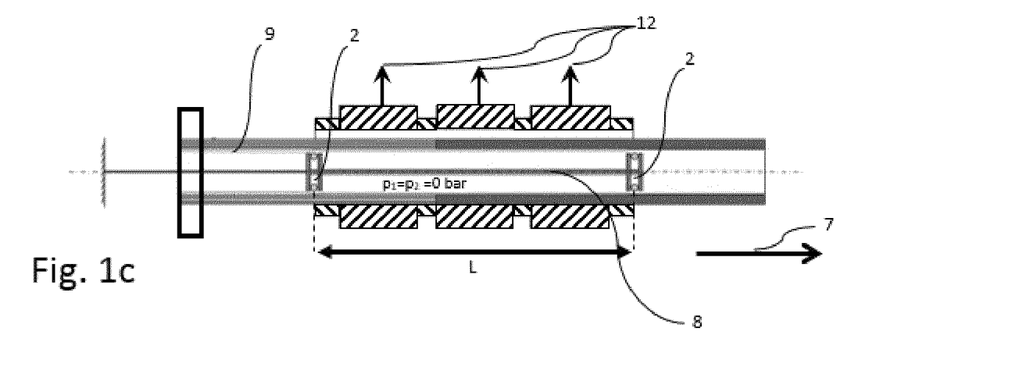
FIG. 1c shows a side view of the consolidation tool according to the invention in a third method step, in the open, pressure-free state, for the feed motion of the preform segment.

FIG. 1c shows a side view of the consolidation device according to the invention in a further method step with an open tool (4) and a pressureless pressure chamber (3). In this method step after the consolidation process, the preform segment (14) is subject to a feed motion (7) by the partial length s, corresponding to the temperature zone lengths defined by the tool segments of the temperature zones (4.1, 4.2 and 4.3).

Figure 2A:
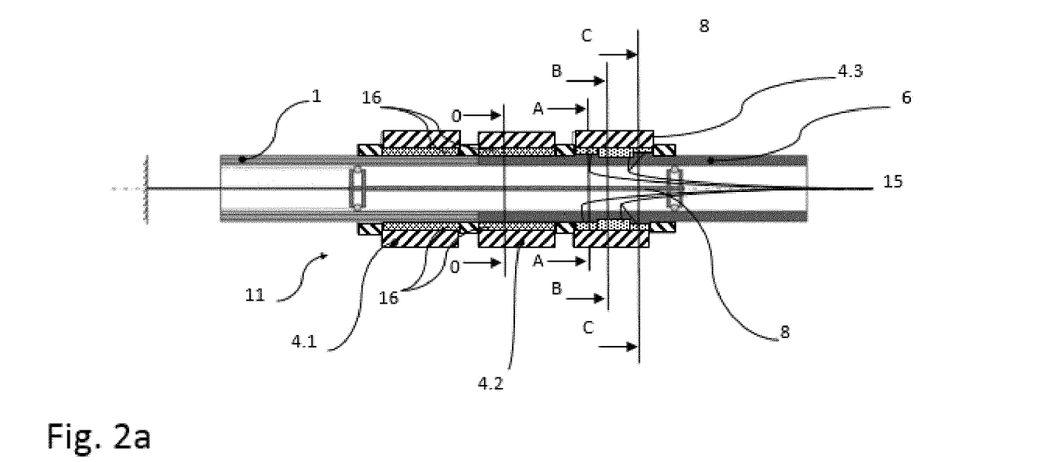
FIG. 2a shows an alternative embodiment of the consolidation tool with a variable cross-section of the resulting component.

FIG. 2a shows an alternative, particularly preferred consolidation device in a closed state with several interchangeable modules (16) of the tool segments (4.1, 4.2, 4.3) inside the tool (4). In this embodiment, the inner tool walls of the tool segment of the solidification zone (4.3) consist of three interchangeable modules (16).

Figure 2B:
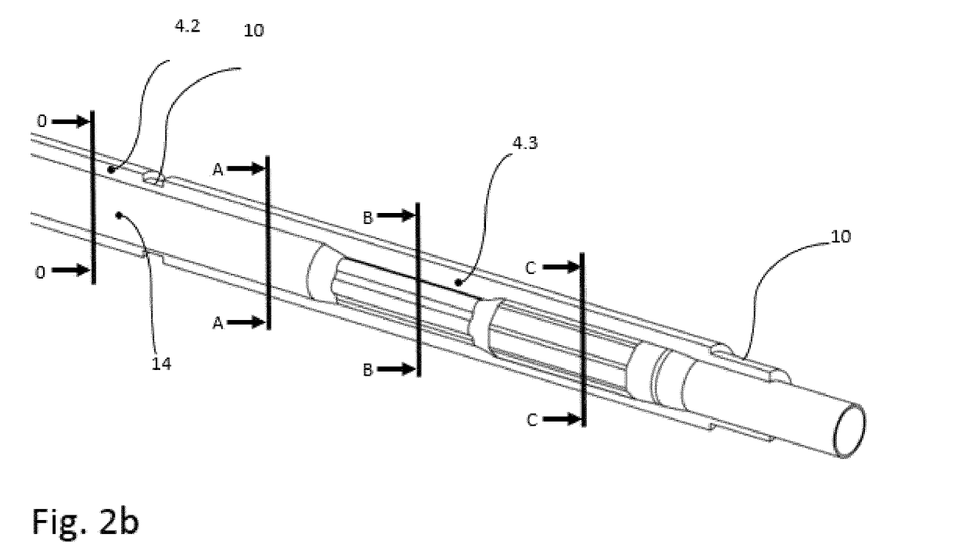
FIG. 2b shows a 3D representation of a preform segment.

FIG. 2b shows a three-dimensional view of a preform segment (14) in a subsection L of the consolidation device (11) with a part of the multi-part tool (4) in touch with the preform segment (14). A section of the preform segment (14) is shown, which is in contact with the tool wall of the melting zone tool (4.2), as well as a section of the preform segment (14), which is in contact with the cavity wall of the consolidation and solidification zone tool (4.3). The respective temperature zones of the tool are thermally decoupled by heat transfer barriers (10).

Figure 3:
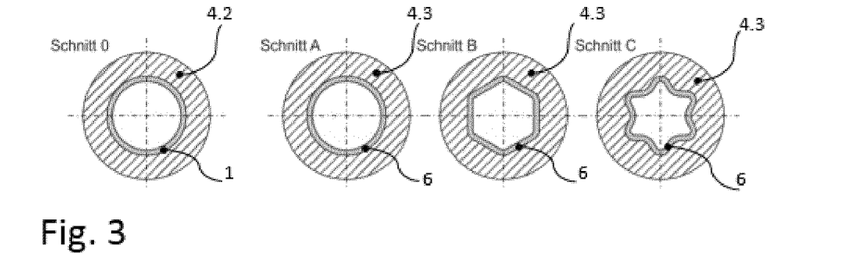
FIG. 3 shows cross-sections of variable-manufacturable cross-section geometries.

FIG. 3 shows exemplary cross-sections of a preform segment with varying cross-sections in axial and radial directions, which may be adjusted over the length L of the consolidation device (11). In section 0, this part of the preform segment is positioned in the tool segment of the heating zone (4.2), and the preform (1) does not yet undergo forming, but is heated to its melting temperature by contact with the tool wall of the tool segment of the heating zone. In the subsequent part of the preform segment, marked by the sections A, B and C, the preform segment is formed into the varying cross-sections of the resulting component (6), and the material is cooled down below the melting temperature of the matrix material.

Figure 4:
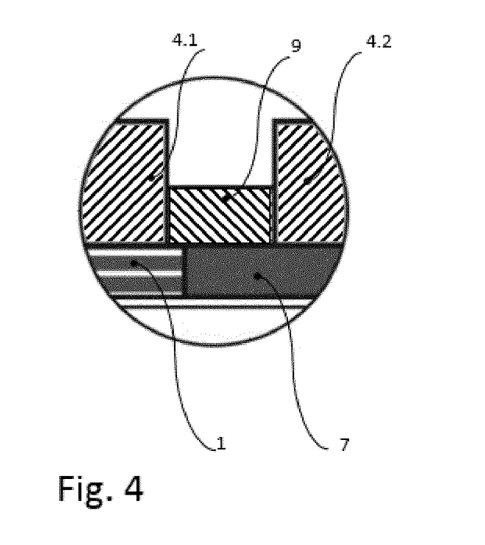
FIG. 4 shows a detailed cross-section of the material transition between the preheating zone and melting zone.

FIG. 4 shows a detailed view of the transition between the preform (1) and the component (6) of the preform segment (14) in the area of the tools preheating zone (4.1) and heating zone (4.2). Both temperature zones are thermally decoupled from each other by heat transfer barriers (10).

Figure 5:
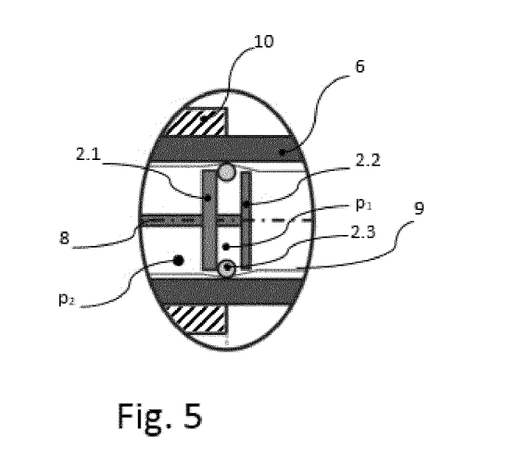
FIG. 5 shows a detailed cross-section of a sealing element.

FIG. 5 exemplarily shows a detailed view of a sealing element (2) in the area of the resulting component (6). In order to separate the pressure chamber (3) from the ambient pressure to allow for the application of the consolidation pressure, a pressure p1 must be applied in the intermediate space formed in between the elastic radial seal (2.3) and the sidewalls (2.1) and (2.2). The sealing effect of the sealing element (2) arises as soon as the radial seal (2.3) locks against the pressure membrane (9), the preform (1) or the component (6), and the tool walls (4.1 and 4.3). For this, the pressure p1 must be greater than the pressure p2. The pressure p1 can be applied to the sealing elements (2) via a channel that extends over the longitudinal axis and over the entire length of the coupling element (8), and which is respectively connected to at least one bore arranged in a radial direction and between the sidewalls (2.1) and (2.2).

Figure 6:
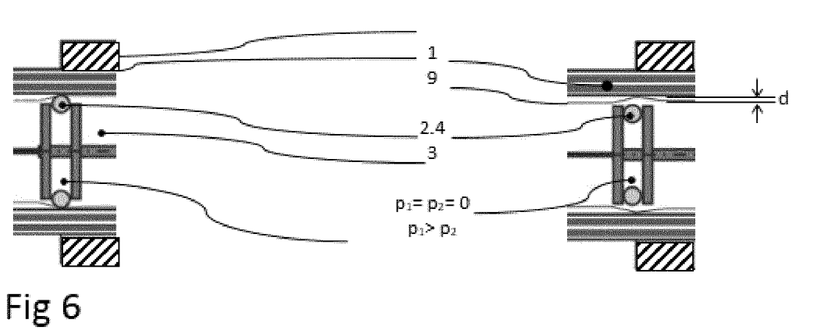
FIG. 6 shows detailed cross-sections of a sealing element unpressurized (left) and pressurized (right).

The left side of FIG. 6 shows a detail of the sealing element (2) with the radial seal (2.3) in its pressurized state. Here, the pressure p1, which is greater than the pressure p2, is effective in the sealing elements and pushes the pressure membrane (9) against the preform (1) in the area of the sealing elements. As a result, the pressure chamber (3) is temporarily formed over the length L of the consolidation device (11) and is subjected to the pressure p2, which presses the pressure membrane (9) against the preform (1).

The right-hand side shows the unpressurized sealing element (2) and the unpressurized pressure chamber (3). The distance d between the pressure diaphragm (9) and the preform (1) is greater than zero.

Figures 7A, 7D:
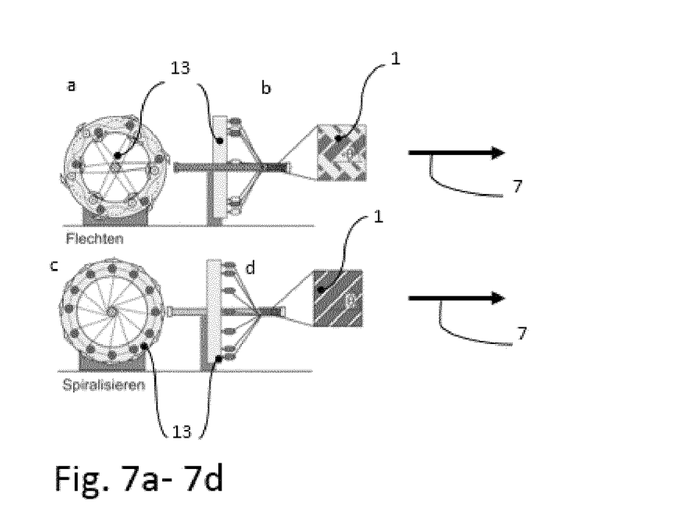
FIG. 7a shows a top view of a preforming unit based on the braiding process.
FIG. 7d: shows a side view of a preforming unit based on the spiralization process.

FIG. 7 a to d show preferred preforming units (13). Such preferred braiding or spiralizing machines are suitable for depositing endless textile semi-finished products on a core, thereby enabling the forming of the Preform (1).

FIG. 8 schematically shows the first three relevant cycles according to the invention at the beginning of the method, which cycles are passed by the preform segment (14) in order to consolidate the preform (1) into a component (6) with the help of the forming tool (4).

In a first cycle, the preform segment (14) is positioned inside the forming tool (4) in such a way that it is completely covered by it, and is at the same time heated or cooled to the respective temperatures in the sections 14.1, 14.2 and 14.3 by contact with the tool segments (4.1, 4.2, 4.2).

In a second cycle, the preform segment is positioned inside the forming tool (4) in such a way that the previous section 14.1 becomes the new section 14.2 and the previous section 14.2 becomes the new section 14.3.

In a third cycle of the method, the preform is again positioned in a way that the previous section 14-A becomes the new section 14.1 and the previous section 14.2 becomes the new section 14.3. During the sequence of cycles, the preform (1) is supplied endlessly and guided to the section 14.1 in every cycle.

The finished component (6) corresponds to the previous section 14.3. As a result of the process, after the execution of the first two cycles at the beginning of the process, a scrap is created from sections 14.2 and 14.3 on which the complete temperature regime has not yet acted.

LIST OF REFERENCE SIGNS 1 preform
2 sealing element
2.1 internal wall of the sealing element
2.2 external wall of the sealing element
2.3 pressure chamber in the sealing element
2.4 elastic seal
3 pressure chamber for the application of the consolidation pressure
4 separable tool
4.1 separable tool of the preheating zone
4.2 separable tool of the melting zone
4.3 separable tool of the consolidation and solidification zone
6 component
7 feed and/or pull-off direction
8 coupling element of sealing elements
9 pressure membrane
10 heat transfer barrier
11 consolidation device of length L
12 travel of the upper tool
13 preforming unit
14 preform segment
15 exchangeable modules of the solidification zone
16 exchangeable modules of the preheating and heating zone

The invention claimed is:

1. A device for the semi-continuous blow moulding of fiber-reinforced, thermoplastic, endless, hollow-profile components with cross sections that are constant or varying in a longitudinal direction, comprising at least one consolidating tool which, in a closed state, encloses a preform, which encloses an elastically deformable pressure chamber, wherein:
   a) a preforming unit and the at least one consolidating tool are arranged directly one after another;
   b) the preforming unit provides the preform;
   c) the preform enclosed by the at least one consolidating tool is a preform segment;
   d) a central axis of the preforming unit, the at least one consolidating tool, the preform segment, and the pressure chamber are arranged congruently;
   e) the at least one consolidating tool is designed in at least two parts; and
   f) the at least one consolidating tool corresponds to a contour of the component;

wherein:
   the at least one consolidating tool has at least two independently isothermal-tempered tool segments, and in that the tool segments are arranged along a middle axis;
   dimensions of the at least one consolidating tool, the pressure chamber, and the preform segment for processing are identical along the central axis;
   the device has a feed device which is capable of repeatedly moving the preform by an amount of a length of one of the tool segments into a machining direction directed along the central axis;
   the pressure chamber is formed from:
   an endless, deformable pressure membrane and sealing elements, or
   a pressure membrane that is a deformable hose firmly attached to sealing elements; and
   the pressure chamber is pressurizable.

2. The device according to claim 1, wherein, on an inner cavity wall, the tool segments comprise exchangeable modules which deviate from the final contour of the component.

3. The device according to claim 1, wherein, on an inner cavity wall, the tool segments comprise at least one exchangeable module, having an inner contour that corresponds to the outer contour of the component.

4. The device according to claim 1, wherein the tool segments have an identical length.

5. The device according to claim 1, wherein the tool segments are thermally decoupled from one another by heat transfer barriers.

6. The device according to claim 1, wherein:
   the pressure chamber comprises at least two sealing elements which have a distance from each other, and which have a pressure-tight connection to a coupling element; and
   each having a seal pressing radially against the pressure membrane at a pressure p1 thus forming the pressure chamber.

7. The device according to claim 6, wherein the coupling element:
   is fixed in an area of the preforming unit; and
   has an air duct along its longitudinal axis that runs along an entire length of the coupling element, wherein the air duct has in the area of the at least two sealing elements radially arranged air outlets that are provided for applying the pressure p1.

8. The device according to claim 1, wherein a material of the pressure membrane:
   corresponds to a same class of materials as an embedding matrix of the preform; and
   has a higher degree of polymerization, and a thickness between 50 and 60 μm.

9. The device according to claim 1, wherein:
   a consolidation pressure p2 lies in a range between 4 and 10 bar, and
   a sealing pressure p1, acting on the pressure membrane between the at least two sealing elements, is greater than the consolidation pressure p2.

10. The device according to claim 1, wherein:
   a consolidation pressure p2 lies in a range between 5 and 9 bar, and
   a sealing pressure p1, acting on the tubular pressure membrane between the sealing elements, is greater than the consolidation pressure p2.

11. A method for semi-continuous blow moulding of fibre-reinforced thermoplastic hollow profiles with cross-sections that are constant or varying in longitudinal direction, comprising at least the steps:

a) providing a tubular pressure membrane which is coated or enclosed with a preform comprising thermoplastic matrix material;
b) providing a device for the semi-continuous blow moulding of fiber-reinforced, thermoplastic, endless, hollow-profile components with cross sections that are constant or varying in the longitudinal direction, comprising at least one consolidating tool which, in a closed state, encloses a preform, which encloses an elastically deformable pressure chamber;
c) positioning of the tubular pressure membrane and the preform such that it extends over an entire length of the at least one consolidating tool and covers sealing elements,
d) closing the at least one consolidating tool;
e) compressing a preform segment by enlarging a diameter of the tubular pressure membrane through pressurization, and nestling the preform segment against an inner wall of the least one consolidating tool;
f) heating a first preform segment in the first tool segment of the at least one consolidating tool to a temperature below a melting temperature of the thermoplastic, heating a second preform segment in the second tool segment of the at least one consolidating tool to a temperature which at least reaches the melting temperature of the matrix material, cooling and shaping a third preform segment in a third tool segment of the at least one consolidating tool to a temperature which is below a solidification temperature of the matrix material;
g) terminating the pressurization of the tubular pressure membrane;
h) opening the at least one consolidating tool and, subsequently, advancing the preform by the length of one tool segment and subsequently closing the at least one consolidating tool; and
i) repeating steps e) to h).

12. The method of claim 11, wherein:
the pressurization via a consolidation pressure (P2) is in a range between 4 bar and 10 bar; and
a sealing pressure (P1) is larger than the consolidation pressure (P2) and acts between the sealing elements and the tubular pressure membrane.

13. The method according to claim 11, wherein reinforcement filaments of the fiber-reinforced thermoplastic hollow profiles of the preform are glass, carbon, basalt and/or thermoplastic filaments which have a higher melting point than a surrounding embedding matrix of the preform.

14. The method according to claim 11, wherein the thermoplastic matrix materials of the preform are organic polymers having melting temperatures in a range between 70° C. and 380° C.

15. The method of claim 11, wherein:
the pressurization via a consolidation pressure (P2) is in the range between 5 bar and 9 bar; and
a sealing pressure (P1) is larger than the consolidation pressure (P2) and acts between the sealing elements and the tubular pressure membrane.

* * * * *